(12) United States Patent
Abinal

(10) Patent No.: US 7,261,135 B2
(45) Date of Patent: Aug. 28, 2007

(54) METHOD FOR MOUNTING A TIRE ON A RIM

(75) Inventor: Richard Abinal, Veyre-Monton (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/616,315

(22) Filed: Jul. 9, 2003

(65) Prior Publication Data

US 2004/0074610 A1      Apr. 22, 2004

Related U.S. Application Data

(63) Continuation of application No. PCT/EP01/15166, filed on Dec. 20, 2001.

(30) Foreign Application Priority Data

Jan. 11, 2001    (FR)   ................................. 01 00498

(51) Int. Cl.
B27H 7/00 (2006.01)
B60C 25/00 (2006.01)
(52) U.S. Cl. .................. 157/1; 157/1.1; 157/1.35; 157/1.42
(58) Field of Classification Search ............ 157/1, 157/1.1, 1.35, 1.42
See application file for complete search history.

(56) References Cited

U.S. PATENT DOCUMENTS 3,029,860 A * 4/1962 Schultz et al. ............. 157/1.22
3,037,549 A * 6/1962 Jacobson ..................... 157/1.22
3,584,672 A * 6/1971 Duquesne ..................... 157/1.3
4,403,640 A * 9/1983 Schifferly .................... 157/1.3
4,527,607 A * 7/1985 Gaither ........................ 157/1.3
4,702,295 A * 10/1987 Ewald ........................ 157/1.22
5,143,134 A * 9/1992 Tran ........................... 157/1.3
5,265,661 A * 11/1993 Tran ........................... 157/1.3

(Continued)

FOREIGN PATENT DOCUMENTS

EP      1 048 496     11/2000

(Continued)

OTHER PUBLICATIONS

International Search Report for International Application No. PCT/EP01/15166.

(Continued)

Primary Examiner—Joseph J. Hail, III
Assistant Examiner—Shantese L. McDonald
(74) Attorney, Agent, or Firm—E. Martin Remick; Adam Arnold; Frank J. Campigotto

(57) ABSTRACT

A method of fitting a tire P and a removable tread support S on a one-piece wheel rim J, rim comprising a first rim seat, inclined outwards, and the tire P comprises a first bead and a second bead to be mounted respectively on the first and second rim seats, in which, before completion of fitting the support S on a rim bearing surface of the rim, the first bead is gripped at a given point and is moved radially outwards to radially separate this point on the first bead from the support S. The fitting of the support S on the rim bearing surface continues and the bead is released after completion of the fitting of the support S.

4 Claims, 9 Drawing Sheets

U.S. PATENT DOCUMENTS

| | | |
|---|---|---|
| 5,634,993 A | 6/1997 | Drieux et al. |
| 5,785,781 A | 7/1998 | Drieux et al. |
| 5,836,366 A | 11/1998 | Muhlhoff |
| 6,092,575 A | 7/2000 | Drieux et al. |
| 6,237,666 B1 * | 5/2001 | Magnani ..................... 157/1.3 |

FOREIGN PATENT DOCUMENTS

| | | |
|---|---|---|
| FR | 2 699 121 | 6/1994 |
| FR | 2 720 977 | 12/1995 |

OTHER PUBLICATIONS

International Preliminary ExaminationReport for International Application No. PCT/EP 01/15166.

* cited by examiner

METHOD FOR MOUNTING A TIRE ON A RIM

CROSS-REFERENCE TO RELATED APPLICATIONS

This application is a continuation of International Application No. PCT/EP01/15166, filed 20 Dec. 2001 and published 18 Jul. 2002 in French as International Publication No. WO 02/055325 A1, and further claims priority to French Application No. 01/00498, filed 11 Jan. 2001.

FIELD OF THE INVENTION

The present invention concerns a method of mounting an assembly formed by a tire and a removable tread support, and more particularly an assembly intended to be mounted on a single-piece rim, at least one of whose seats is inclined outwards.

BACKGROUND OF THE INVENTION

As described in the French patents FR 2 699 121, FR 2 713 557 and FR 2 713 558, such a rim has, seen in meridian section, a first seat whose axially outer end is on a circle with a diameter less than the diameter of the circle on which the axially inner end is situated (such a seat is said to be inclined outwards), a relatively wide rim bearing surface intended to receive a removable tread support ring, possibly a mounting well, and a second rim seat, a either identical to or different from the first rim seat. The rim, a tire having an adapted meridian carcass reinforcement profile and bead shape, and a removable support together form a rolling assembly which is of high performance in the case of running at low pressure or even zero pressure.

The patent FR 2 720 977 describes a method of mounting, on a single-piece rim, a tire comprising a first bead and a second bead which will be mounted respectively on the first and second rim seat, and a removable support. The mounting method is such that:
the support is, in a first step, placed inside the tire;
the second bead and the support are placed on the rim, from the side opposite to the second rim seat, until they are positioned on the rim bearing surface,
the process of fitting the support on the rim bearing surface is completed and the first bead is mounted on the first rim seat; and
the second rim is mounted on the second rim seat.

The document EP 1 048 496 A1 describes a device for implementing this mounting method in which the first rim and the support are simultaneously fitted on the rim by progressive application of an axial force against the first bead of the tire, itself being seated against the adjacent wall of the support. The tool applying the axial force is a freely rotating roller whereby this fitting takes place during a rotation of the rim which also drives the tire and support in rotation. This method is effective in the case of supports which, in the state in which they are fitted on the rim bearing surface, are in contact with the first tire bead or very close to it.

The document FR99/10108 presents similar rims adapted to receive lightened supports for the tire tread. In the mounted state, these supports are separated from the inner wall of the tire bead by an appreciable distance, for example about ten centimeters. In the case of the mounting of tire/support assemblies on such rims, it can be seen that the bead has difficulty in following the movement of the support during the fitting of the support on the adapted rim bearing surface. The first bead may lose contact with the pressing roller in the radially outward sense. In this case, the bead may contact the top of the support and there is a risk of contamination due to the lubricant used to facilitate running at low pressure or zero pressure.

As these rims usually have a circumferential well adjacent to the first rim seat (see FIG. 1), the first bead may position itself into this circumferential well during the fitting of the support on the rim bearing surface. There is then a great deal of difficulty in removing it from this position. If the bead remains positioned between the support and the pressing roller, the magnitude of the movement necessary for fitting the support imposes high flexion on the tire which may damage it. Finally, in each case, the correct fitting of the support may remain in doubt.

SUMMARY OF THE INVENTION

The object of the invention is a method of mounting, on a single-piece rim J, comprising a first rim seat, inclined outwards, extended axially outwards by a projection of low height and joined axially inwards to a rim bearing surface intended to receive a tread support S, and a second rim seat, inclined outwards, whose axially inner end is on a circle with a diameter greater than the diameter of the circle on which the axially inner end of the first rim seat is situated, a tire P comprising a first bead and a second bead which will be mounted respectively on the first and second rim seats, and a removable support S, comprising the steps of:
(a) placing said tread support S into said tire P,
(b) placing, from the side opposite to the second rim seat, the second bead of said tire P and said tread support S on the rim J until positioned on said rim bearing surface;
(c) fitting said tread support S completely onto said rim bearing surface and mounting the first bead on the first rim seat; and
(d) mounting the second bead on the second rim seat, and characterized in that:
the first bead seat of said tire P is gripped at a given location prior to completely pushing said tread support S on said rim bearing surface, then
the given location of the first bead seat is moved radially outward to move the first bead seat radially away from said tread support S,
the tread support S is then pushed completely onto said rim bearing surface, and
the first bead seat is released after completing the pushing of the said tread support S on to said rim J.

Moving the bead radially outward during the fitting of the support gives better control of the conditions of fitting the support. In particular, this has the advantage of avoiding contact between the first bead and the top of the support.

Advantageously, the process of fitting the support S is completed by direct pushing with an application tool against the wall of the support S disposed on the side of the first bead while rotating the rim.

Preferentially, the support S is fitted on the rim bearing surface of the rim J until there is contact between a stop on the application tool and the external projection on the first seat of the rim J. This has the advantage of precisely defining the maximum magnitude of the axial movement of the application tool.

After having fitted the support on its rim bearing surface, the first bead is released and the normal mounting of the two beads on their rim seats is continued.

When the rim has a mounting well disposed between the second seat and the rim bearing surface, the second bead may be placed in this mounting well during step (b). In this case, after having finished fitting the support on the rim bearing surface and before releasing the first bead, the first bead is moved axially outward to exert a traction on the second bead to create a local space between the second bead and the wall adjacent to the second seat of the mounting well. Then, a mounting lever is inserted into the space created between the second bead and the wall adjacent to the second seat of the mounting well. The insertion of this mounting lever makes it possible to remove the second bead from the mounting well to bring it outside the rim on the side of the second seat 13" prior to its mounting on this second seat.

Another object of the invention is a tool for fitting tire beads and a support S on a single-piece rim J, characterized in that it has:

an elongate-shaped bracket having an axis A, a finger extending from said bracket in a direction B perpendicular said axis A; and a means for transmitting an application force from said bracket to a zone C projecting beyond said finger, said zone C being offset a distance D measured in the direction B from said axis A of said bracket.

Advantageously, the tool has a stop disposed in the direction B relative to the bracket and offset relative to the finger in the direction A beyond the force transmission means. This stop can be a freely rotating roller and with an axis of rotation coaxial with or parallel to the axis A.

The means for transmitting an application force can be a slider or a freely rotating pressing roller. This roller can have its axis of rotation A' parallel to the axis A. The roller can be directly fixed to the finger.

DESCRIPTION OF THE SEVERAL VIEWS OF THE DRAWINGS

The invention is illustrated by the accompanying drawings, where.

DETAILED DESCRIPTION OF THE INVENTION

Figure 1:
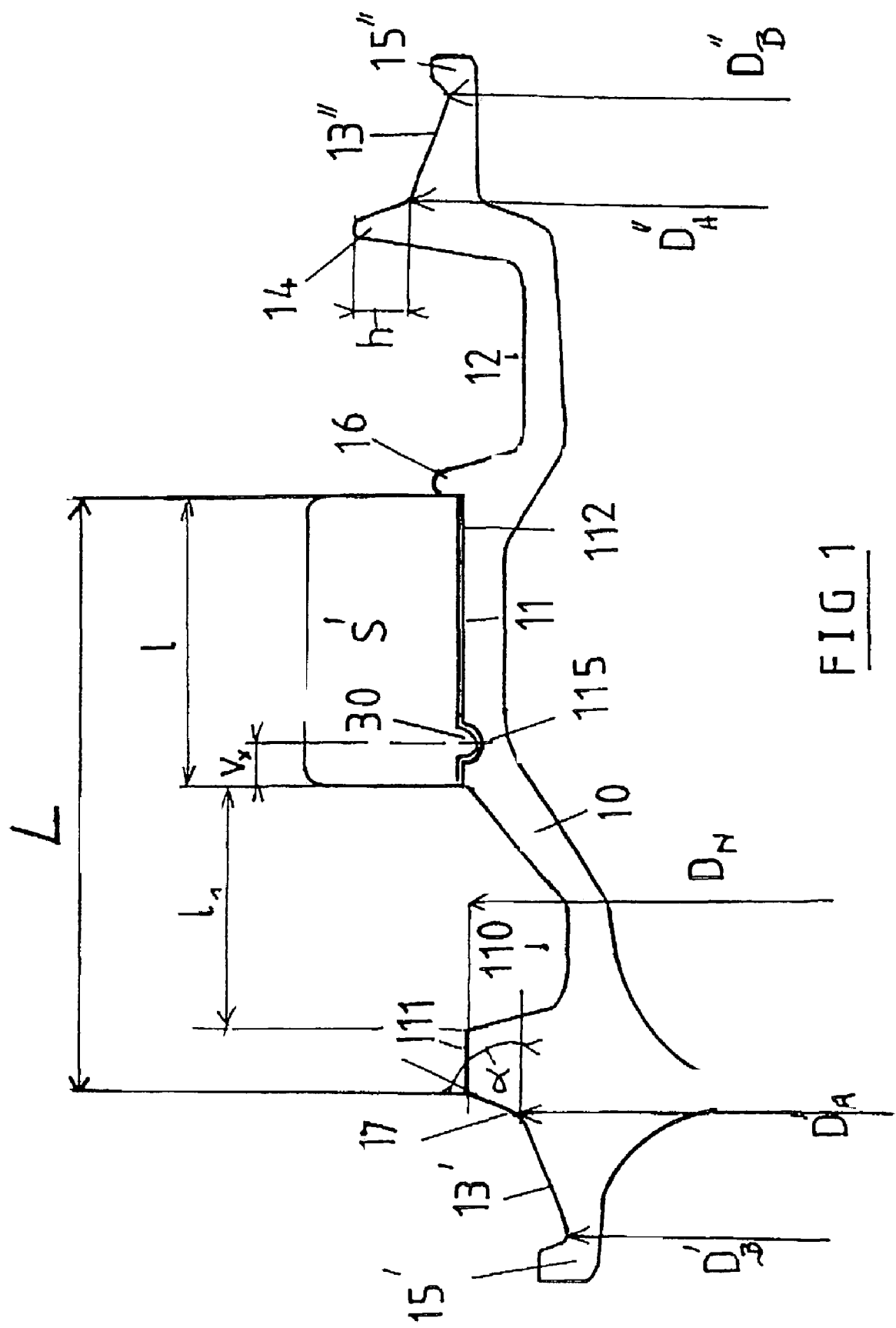
FIG. 1 depicts schematically, seen in meridian section, an assembly consisting of support and rim as disclosed in the application FR99/10108.

FIG. 1, shows a meridian section of a single-piece rim 10 as disclosed in the application FR 99/10108. This rim when coupled with a disc forms a single-piece wheel. The disc can also be manufactured independently of the rim and joined thereto later. The rim 10 comprises two frustoconical rim seats 13' and 13" with unequal diameters respectively $D'_A$ and $D''_A$. The diameter of a frustoconical seat means the diameter of its largest circular end. The generatrices of two seats 13' and 13" are inclined outwards, the diameters $D'_A$ and $D''_A$ respectively of their axially inner ends being greater than the diameters $D'_B$ and $D''_B$ of their axially outer ends. The two frustoconical seats are extended axially outwards by two projections or humps 15' and 15" of low height. The first seat 13', intended to be mounted facing to the exterior of the vehicle, is extended axially outward by a frustoconical part 17 inclined at an angle α relative to the axial direction. The axially inner end of the frustoconical part 17 is also the end of the rim bearing surface 11 oriented axially to the exterior of the vehicle. The rim bearing surface consists of two seating zones 111 and 112 for the support S separated by a circumferential well 110. The diameter of the rim bearing surface 11 is $D_N$. The seating zone 112 is proximate to the second rim seat 13" and is intended to be mounted to the interior of the vehicle. The seating zone 112 has its end proximate to the rim seat 13" provided with a positioning projection or stop 16 intended to prevent the inward-axial movement of the tread support S which will be disposed on the rim bearing surface 11. The second seat 13" extends axially inwards by a flange 14 of low height h of about 3 to 4 mm. This flange 14 delimits, in conjunction with the position stop 16, a mounting well 12 for fitting the tire bead which will be mounted on the seat 13".

The support S is made from a rubber-like material and has an axial width 1 substantially less than the axial width L of the rim bearing surface 11. In the instant example, 1 is equal to about 0.5 L. When the rim includes a circumferential well 110, the width 1 of the support S must be greater than the width $1_1$ of the well 110. In this case, the first seating zone 111 of the rim bearing surface 11 is useful only for the mounting and removal of the support due to the reduced axial width of the support S.

The radially outermost face of the second seating zone 112 of the rim bearing surface 11 is provided with a circumferential groove 115 having a semicircular form with a small radius of about 4.5 mm. That is to say, the radius is substantially the same magnitude as the height of a projection 15'(15"). The radially inner wall of the support S is provided with a protuberance 30, preferably circumferential, intended to cooperate with the groove 115 in the second support seating zone 112 to prevent any axial movement of the support towards the first seat 13' while in service. The protuberance 30 consists of the same rubber-like material as that of the support and may be reinforced or not. Where the protuberance 30 is reinforced, it will preferentially be reinforced by a circumferentially continuous elastic wire or filament, or a continuous strand of several elastic wires or filaments. That is to say, the filaments have a certain degree of extension under an elongation force and regain their initial shape as soon as the force disappears. The protuberance 30 is preferentially situated axially between the end of the radially inner face of the support S axially closest to the seat 13' and the middle of the face. The axial distance $V_x$ separating the mid-axis of the protuberance 30, which is also the mid-axis of the groove 115, from the end of the support seating zone 112 oriented to the exterior of the vehicle is between 0.1 and 0.2 times the axial width 1 of the support S. First, this is to have better centering of the support on the seating zone 112. Second, this is to minimize the length of movement under compressive force of the protuberance on the support, although the circumferential elasticity of the protuberance 30 allows easy fitting of the support on the rim bearing surface 11.

Figure 2:
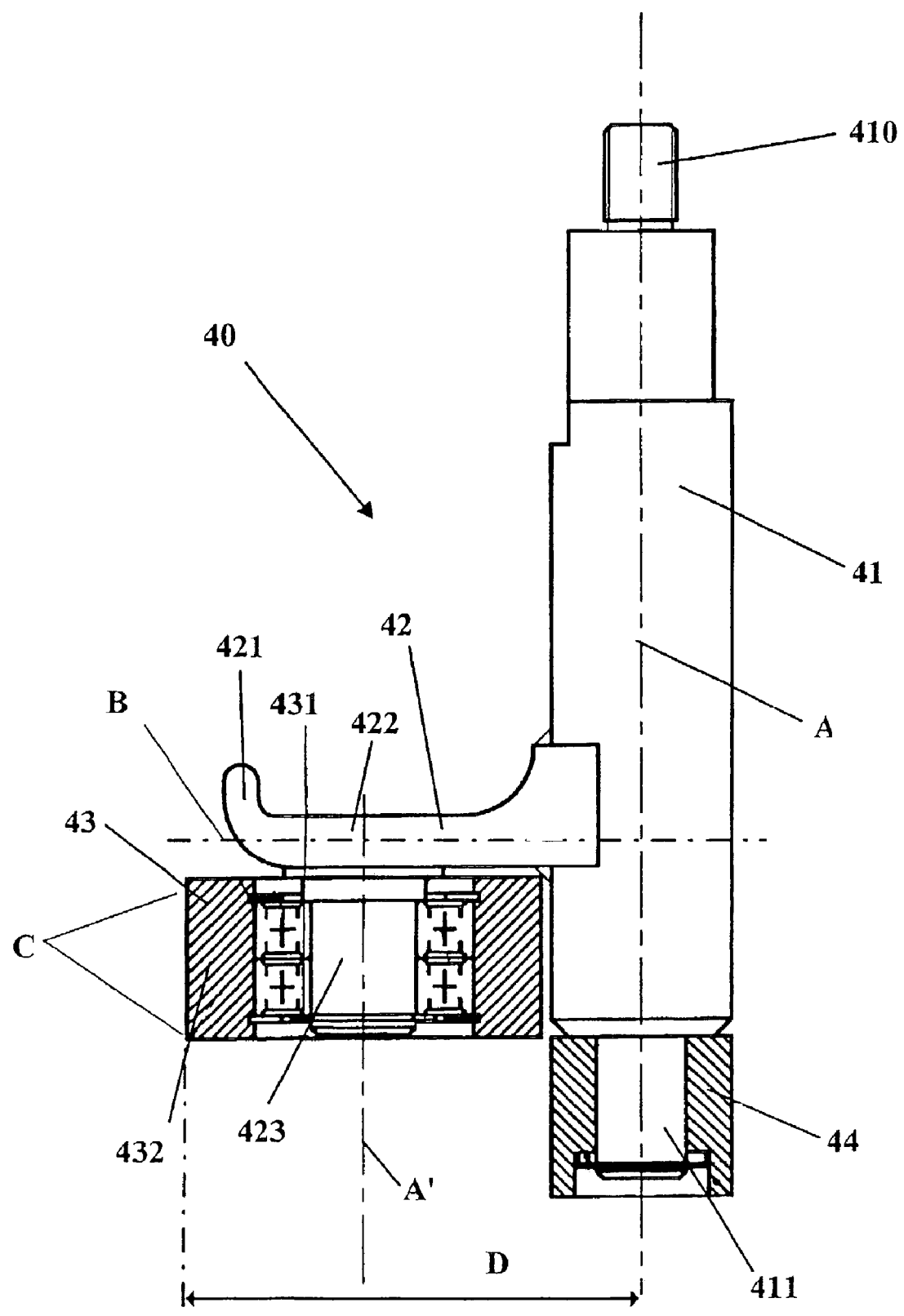
FIG. 2 depicts, in side view, a tool according to the invention.

FIG. 2 presents in side view a tool according to the invention. This tool 40 for fitting tire beads and tread supports comprises an elongate-shaped bracket 41 with a substantially cylindrical section of axis A, a finger 42, a pressing roller 43, and a stop 44. This tool also comprises at one end a first fixing projection 410 adapted to snap into a tool support (not shown). The finger 42 extends in the direction B with a substantially linear part 422 of sufficient length to hold a tire bead. The finger 42 terminates in a hook 421 of low height. The direction B is substantially perpendicular to the axis A. The pressing roller 43 is fixed to the finger 42 by a second substantially cylindrical connecting projection 423. The roller comprises an elastic ring 432 disposed around a ball bearing 431. The ball bearing 432 fits around the second connecting projection 423. The pressing roller 43 is thus free to rotate about its axis A'. The axis of rotation A' of the roller is parallel to the axis A. The axial height of the elastic ring 432 and thus that of the pressing roller is about 30 to 50 mm. A third projection 411 is disposed at the end of the support 40 opposite to the fixing projection 410. An elastic ring 44 is disposed around this support to serve as a stop. The end of the pressing roller 43 in the direction B opposite to the bracket 41 forms the force transmission zone C. The zone C is situated a distance D from the bracket 41. D is greater than the distance separating the end of the hook 421 from the bracket 41.

Figure 3:
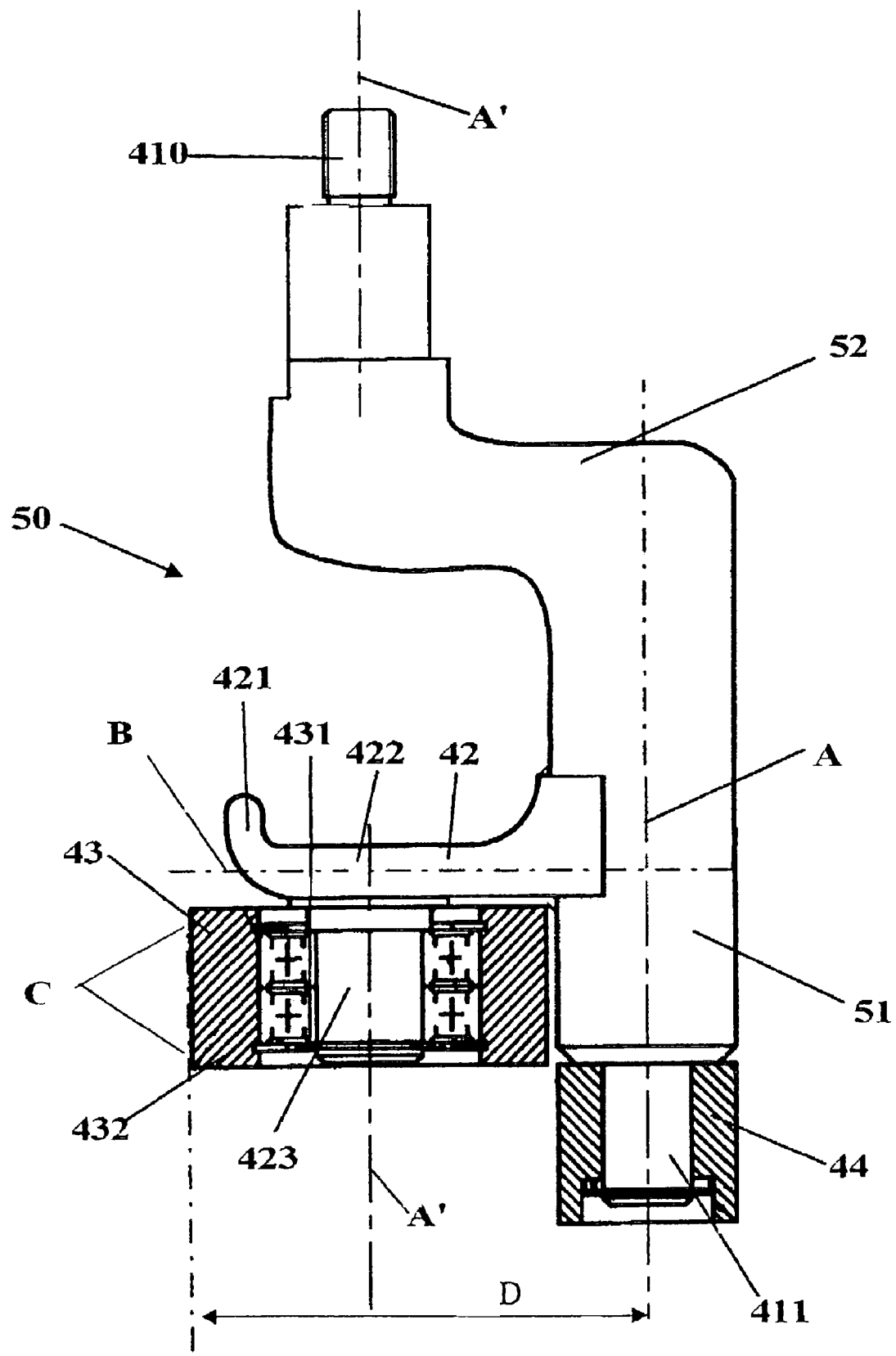
FIG. 3 presents, in side view, a variant of the tool according to the invention.
Figure 4:
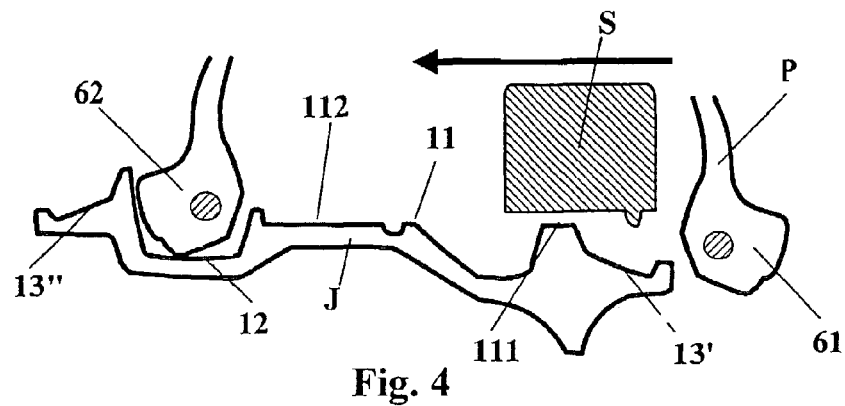
FIGS. 4 to 13 illustrate schematically the different the steps according to the invention of the method of mounting the tire/support assembly on a rim similar to that in FIG. 1.

FIG. 3 presents a variant 50 of the tool of the invention where the axis of the fixing projection is offset relative to the axis A of the support 51 in the direction B until it is substantially coaxial with the axis A' of the pressing roller 43. This offset distance can be as much as the distance D. The support 51 has a part 52 in the form of an S. The advantage of this variant is to facilitate installation on existing mounting machines without reducing the maximum acceptable width of the wheels.

FIGS. 4 to 13 illustrate schematically the mounting method according to the invention for the example of a rim with a mounting well similar to that shown in FIG. 1. These figures illustrate the respective positions of the rim J, the support S and the beads 61 and 62 of the tire P, with the rim mounted on a horizontal, rotating shaft. The figures correspond to the respective positions as seen in a vertical plane passing through the axis of rotation of the rim.

The first step is to insert the support S into the tire P. This insertion is described in the application FR 2 720 977 pages 3 and 4 and illustrated in FIGS. 1A, 1B and 1C of that application. The support is inserted after ovalisation of the support and/or of the tire, or after curving of the support.

Next, the wheel is mounted on a rotating shaft, horizontal in the instant example, of an appropriate mounting machine. An operator then mounts the second bead 62 of the tire P along with the support S positioned on the seating zone 111. The tire P and the support S are then in the position illustrated in FIG. 4: the second bead 62 is placed (at least in the zone illustrated) in the mounting well 12, the support S is fitted around the first support seating zone 111, the first bead 61 remains completely outside the rim J.

Figure 5:
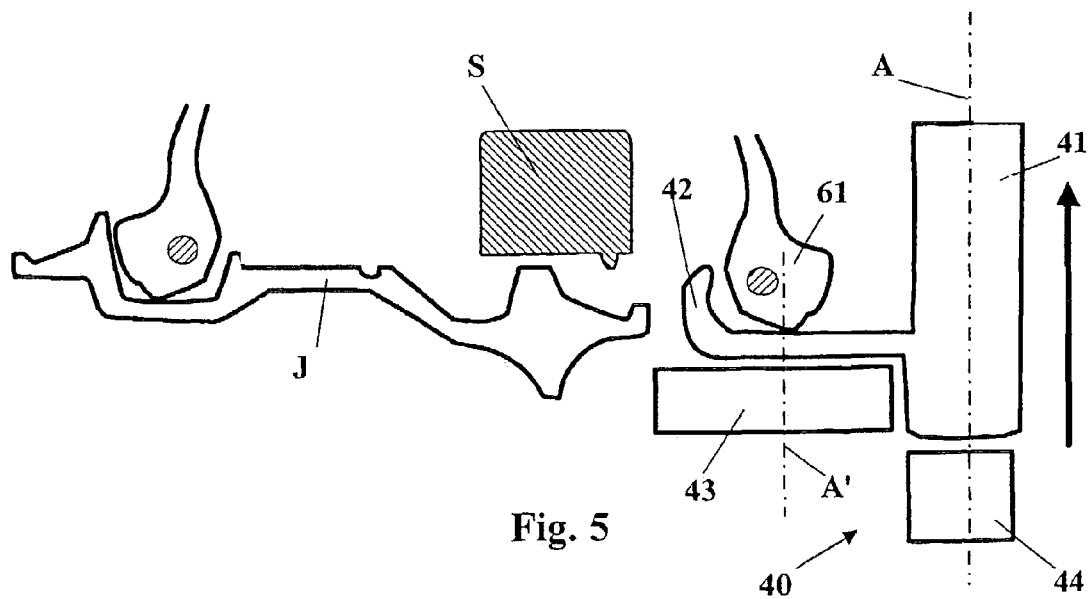
Figure 6:
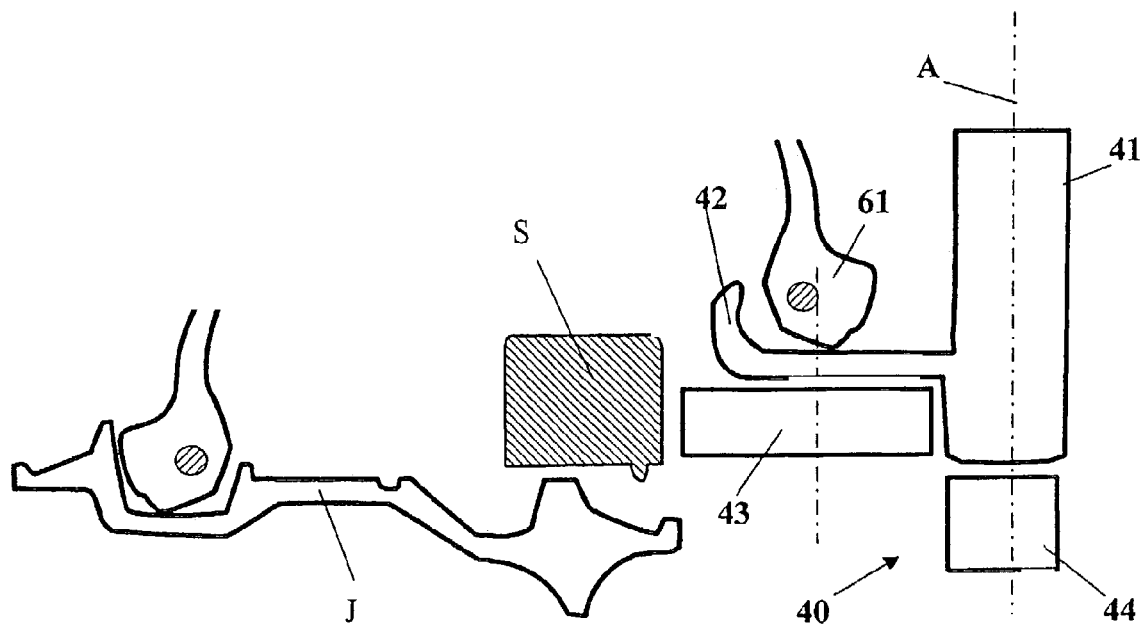
Figure 7:
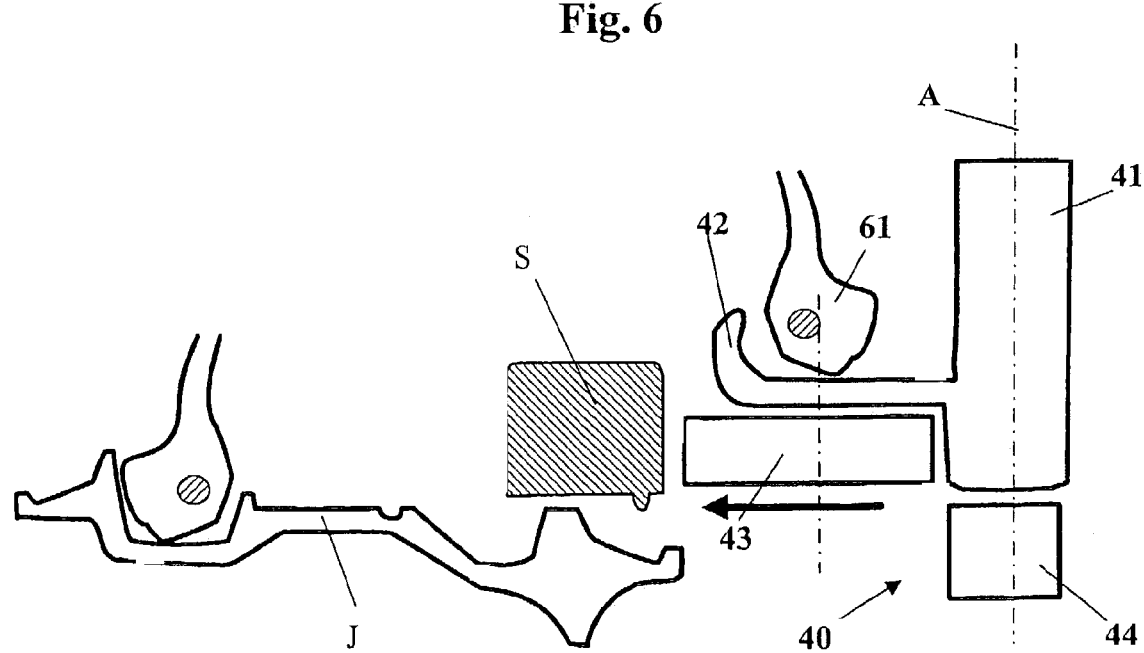

As illustrated in FIG. 5, the tool 40 then moves under the first bead 61 to grip the first bead 61 with the finger 42 of the tool 40. Next, the tool 40 moves vertically until the radially bottom part of the roller 43 is above the rim bearing surface 11. FIG. 6 illustrates this position. The arrow in FIG. 7 indicates how the tool 40 moves axially to apply the pressing roller 43 directly against the axially rear face of the support S while at the same time rotating the rim and thereby also rotating the tire and the support. This makes it possible to fit progressively the support S onto the rim bearing surface 11.

Figure 8:
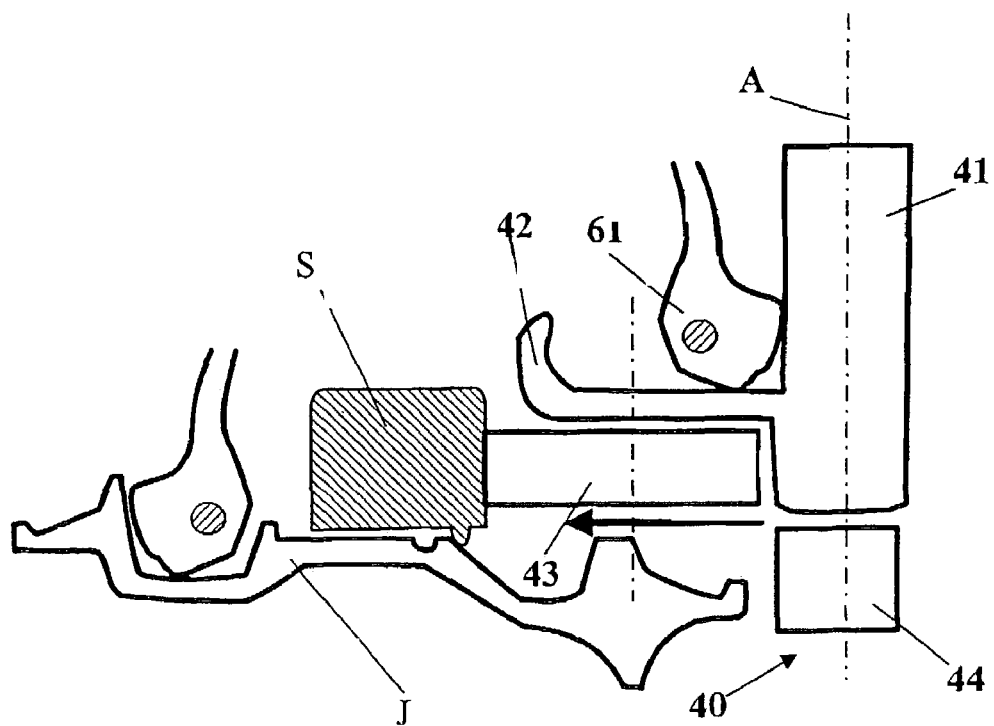

FIG. 8 illustrates an intermediate position of the fitting of the support. It can be noted that the bead 61 can move freely back on the finger 42 during this fitting, which substantially reduces the bending forces imposed on the crown of the tire.

Figure 9:
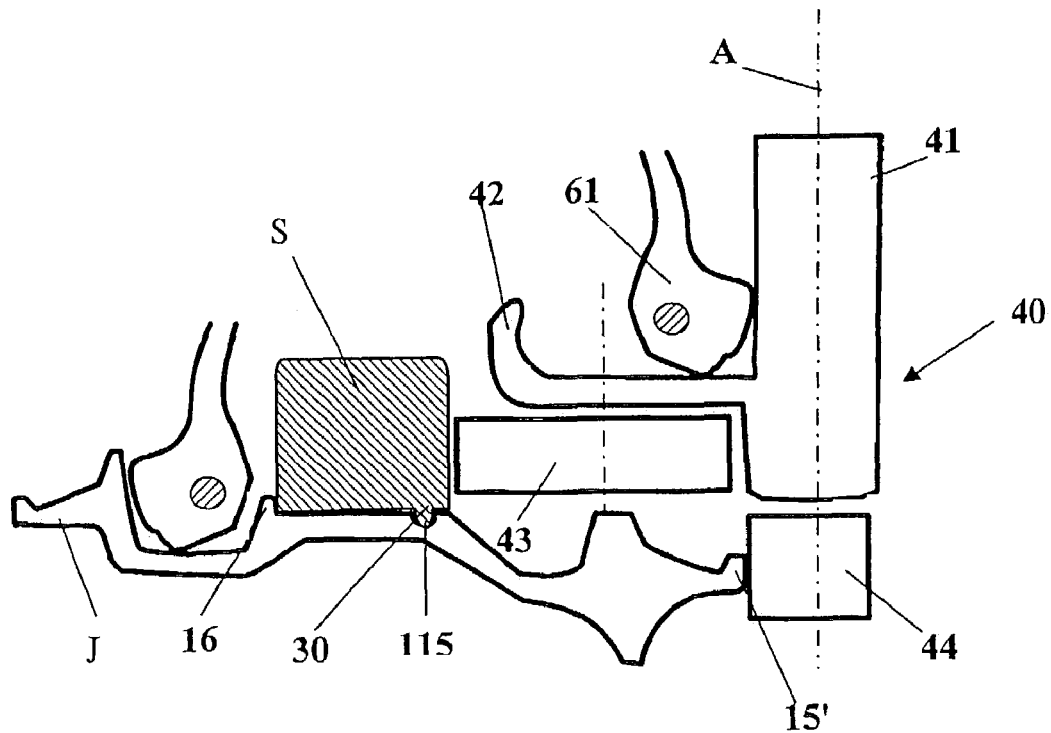
Figure 10:
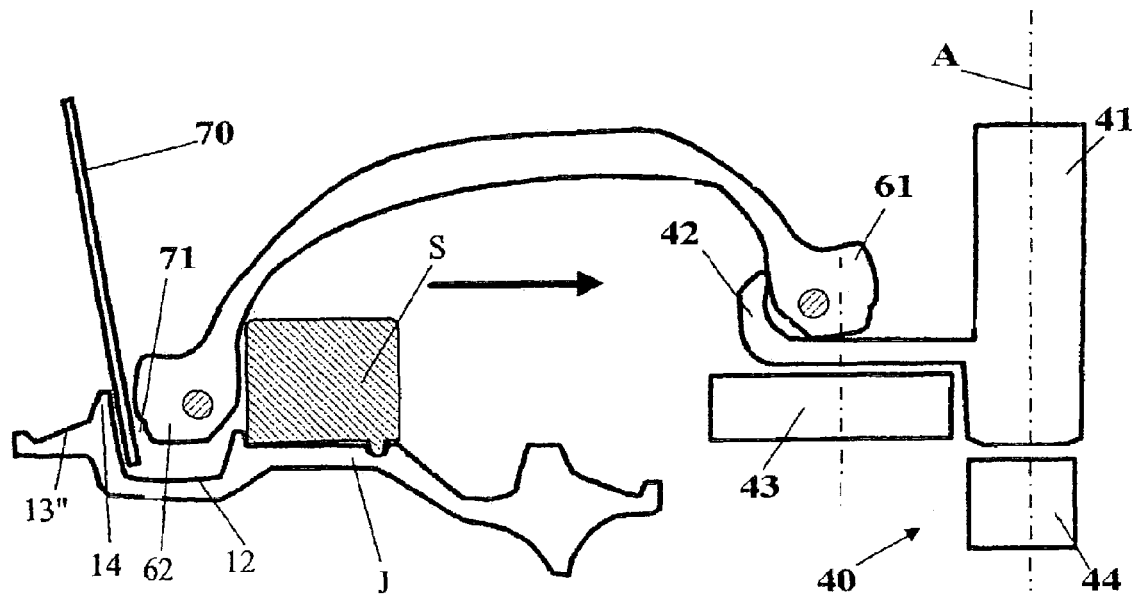
Figure 11:
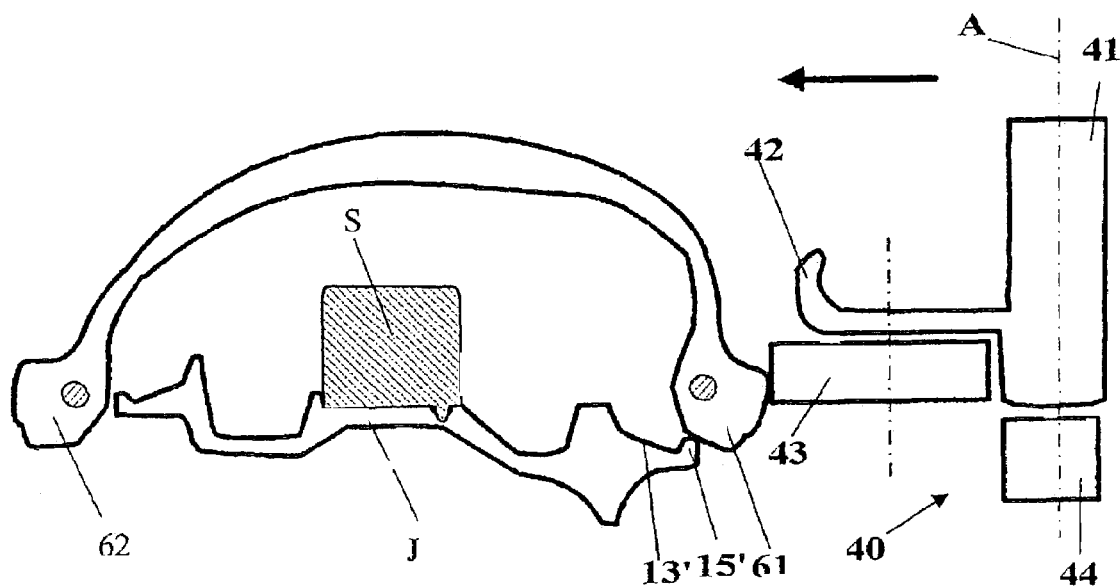

FIG. 9 illustrates the completion of the fitting of the support onto the second seating zone 112. The support seats against the projection 16 and the projection 30 on the support snaps into the groove 115 in the seating zone 112. In this position, the stop 44 on the tool 40 seats against the projection 15'. The exact position of this stop 44 relative to the zone of application of the forces C is determined taking account of the deformations of the support S during its fitting. It is then possible to be certain that the support is in place correctly when the stop 44 contacts the projection 15'.

After having completed fitting the support on the seating zone 112, the tool 40 withdraws axially to exert a traction on the second bead. This traction slightly raises the bead 62 from the bottom of the mounting well 12 and leaves a free space between the bead 62 and the wall of the mounting well adjacent to the projection 14 on the second seat 13" (see FIG. 10). A mounting lever 70 can then be inserted in this space to remove the second bead 62 from the mounting well 12 and place it outside the second seat 13" (see FIG. 11).

After having inserted the lever 70 and released the bead 62 from the mounting well 12, the first bead 61 is released from the finger 42. The first bead 61 is then fitted on the first seat 13' by causing it to progressively pass over the projection 15' by pressing the roller 43 against the first bead (see FIG. 13) while rotating the rim.

Figure 12:
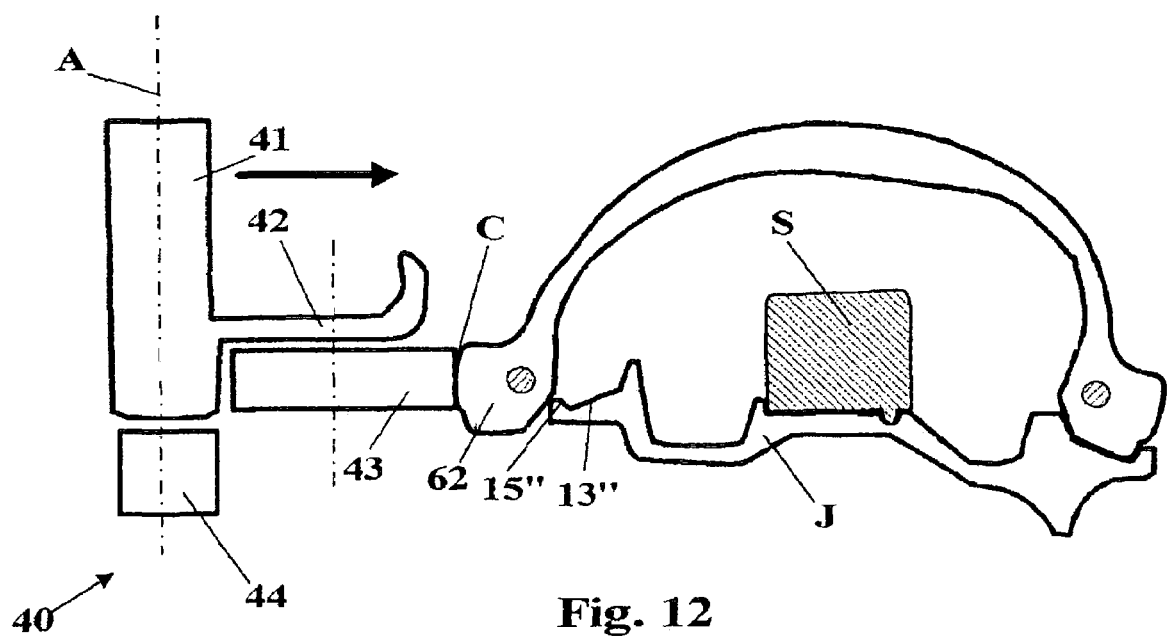
Figure 13:
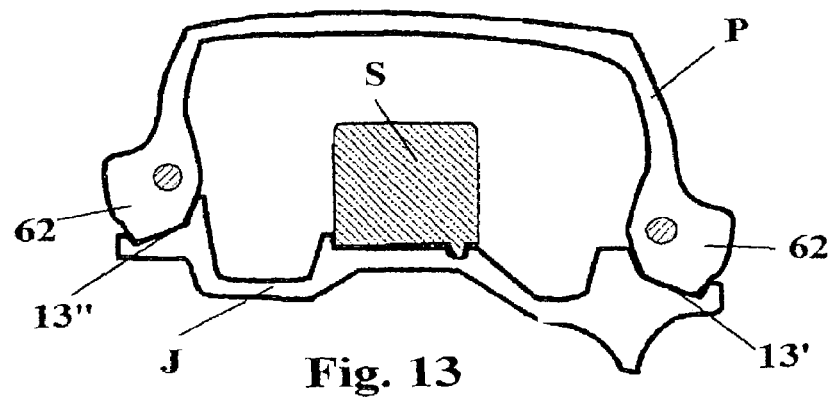
Figure 14:
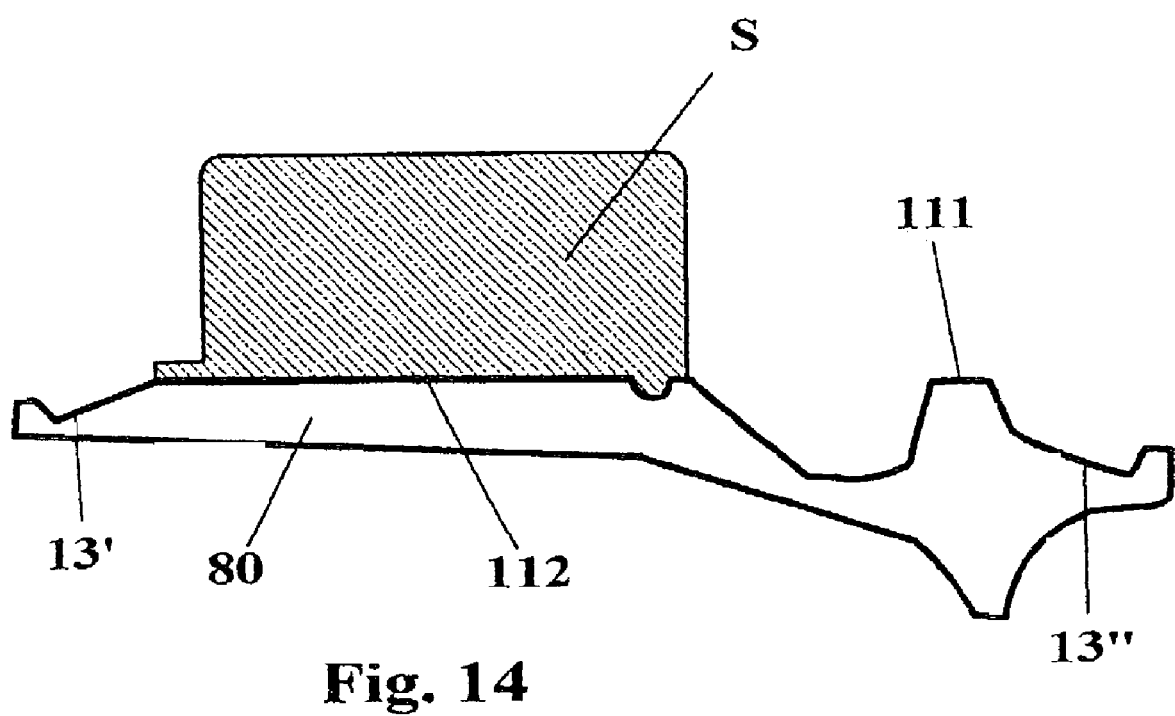
FIG. 14 depicts schematically, seen in meridian section, a second assembly consisting of a support and a rim, without a mounting well, as disclosed in the application FR99/10108.

After having completed the mounting of the first bead, the tool 44 is moved and, preferably, is reversed for mounting the second bead 62 on its seat 13" while causing it to progressively pass over the projection 15" by means of pushing the roller 43 while rotating the rim (see FIG. 12). If it is not possible to reverse the tool 40, it is also possible to mount the second bead by pressing the roller 44, preferably provided with a ball bearing. The tire P and the support S are then completely assembled on the rim J (FIG. 13). FIG. 14 presents, as seen in meridian section, a single-piece rim 80 as disclosed in FIG. 2 of the application FR 99/10108. This rim 80 does not have any mounting well and the seating zone 112 is directly connected to the axially inner end of the second rim seat 13". The mounting method and the tool according to the invention are entirely applicable also to the mounting of a support S and of a tire P on such a rim. When the support is fitted by pressure of the pressure roller 43, the axially front wall of the support pushes the second bead until it is fitted on its seat 13".

The invention claimed is:

1. A method of fitting a tire (P) and a removable tread support (S) on a one-piece wheel rim (J), said rim comprising a first rim seat, inclined outwards, extended axially outwards by a projection of low height and joined axially inwards to a rim bearing surface intended to receive said tread support (S) and a second rim seat, inclined outwards, whose axially inner end is on a circle with a diameter greater than a diameter of a circle on which the axially inner end of the first rim seat is situated, and said tire (P) comprising a first bead and a second bead which will be mounted respectively on the first and second rim seats, said method comprising the steps of:
    (a) placing said tread support (S) into said tire (P),
    (b) placing, from a side opposite to the second rim seat, the second bead of said tire (P) and said tread support (S) on the rim (J) until positioned on said rim bearing surface;
    (c) fitting said tread support (S) completely onto said rim bearing surface and mounting the first bead on the first rim seat; and
    (d) mounting the second bead on the second rim seat;

whereby the step (c) of fitting said tread support onto said rim bearing surface further comprises the sequence of sub-steps of:
- first, gripping the first bead seat of said tire (P) at a given location before completely pushing said tread support (S) on said rim bearing surface, then
- moving radially outward said given location of the first bead seat to move the first bead seat radially away from said tread support (S),
- pushing said tread support (S) completely onto said rim bearing surface, and
- releasing the first bead after completing the pushing of the said tread support (S) on to said rim (J).

2. The mounting method according to claim 1, wherein the step (c) of fitting said tread support (S) on said rim bearing surface is accomplished by direct axial pushing of an application tool against the wall of said tread support (S) and said tool being disposed on the side of said tread support corresponding to the first bead and while rotating said rim about its axis of symmetry.

3. The mounting method according to claim 2, wherein the step (c) of fitting said tread support (S) on said rim bearing surface is continued until a stop on said application tool contacts an external projection on the first seat of said rim (J).

4. The mounting method according to claim 3, wherein said rim (J) further comprises a mounting well disposed between the second seat and said rim bearing surface of said tread support, and wherein
- the step (b) of placing the second bead of said tire (P) and said tread support (S) further comprises placing the second bead into said mounting well, and
- after fitting completely said tread support (S) on said rim bearing surface and before releasing the first bead of said tire, moving the first bead axially outwardly to exert a traction on the second bead to create a local space between the second bead of said tire (P) and the wall of said mounting well adjacent to the second seat of said rim (J), and introducing a mounting lever into said local space between the second bead and the wall of the mounting well adjacent to the second seat.

* * * * *